(12) United States Patent
Okada et al.

(10) Patent No.: US 7,532,805 B2
(45) Date of Patent: May 12, 2009

(54) AUDIO-VISUAL DATA RECORDING/REPRODUCING DEVICE

(75) Inventors: Masahiro Okada, Osaka (JP); Yuji Tanikawa, Osaka (JP); Kazuhiro Mihara, Osaka (JP)

(73) Assignee: Panasonic Corporation, Tokyo (JP)

( * ) Notice: Subject to any disclaimer, the term of this patent is extended or adjusted under 35 U.S.C. 154(b) by 1161 days.

(21) Appl. No.: 10/615,789

(22) Filed: Jul. 10, 2003

(65) Prior Publication Data

US 2004/0008731 A1  Jan. 15, 2004

(30) Foreign Application Priority Data

Jul. 12, 2002  (JP) .............. 2002-204332

(51) Int. Cl.
*H04N 7/00* (2006.01)
*H04N 7/173* (2006.01)
(52) U.S. Cl. .............. 386/95; 386/124; 725/109; 725/54; 370/509; 709/231; 709/232
(58) Field of Classification Search ............. 386/69, 386/95, 124; 725/54; 709/231, 232; 370/509
See application file for complete search history.

(56) References Cited

U.S. PATENT DOCUMENTS 6,163,644 A    12/2000  Owashi et al.
6,169,843 B1   1/2001   Lenihan et al.
6,233,393 B1   5/2001   Yanagihara et al.
6,351,474 B1 * 2/2002   Robinett et al. ............. 370/486

FOREIGN PATENT DOCUMENTS

JP    08-339630     12/1996
JP    2002-185924   6/2002

OTHER PUBLICATIONS

Japanese Office Action with English Translation, issued in corresponding Japanese Patent Application No. 2002-204332 mailed on Oct. 23, 2007.

* cited by examiner

*Primary Examiner*—Thai Tran
*Assistant Examiner*—James A Fletcher
(74) *Attorney, Agent, or Firm*—McDermott Will & Emery LLP

(57) ABSTRACT

An AV data recording/reproducing device is connected to a digital broadcasting tuner and the like via an IEEE1394 bus, in order to realize high-speed transfer when duplicating or transporting AV data between devices such as audio-visual data recording/reproducing devices. A synchronous transfer input/output portion inputs and outputs stream data that are AV data by isochronous transfer with an MPEG-2 transport stream. A recording control portion and a reproduction control portion generate timestamped data and reproduce the stream data, and an HDD stores the timestamped data. An asynchronous transfer input/output portion asynchronously inputs and outputs the timestamped data by SBP-2 transfer. Consequently, the timestamped data that can reproduce the stream data are transferred at high speeds, regardless of an actual time required for performing the display or the like of the stream data.

15 Claims, 8 Drawing Sheets

AUDIO-VISUAL DATA RECORDING/REPRODUCING DEVICE

BACKGROUND OF THE INVENTION

The present invention relates to a recording/reproducing device for audio-visual data transferred via a network or the like, and particularly to an improvement with which audio-visual data can be transferred between recording/reproducing devices or the like at high speeds.

With the recent start of digital television broadcasting, appliances such as BS digital tuners and televisions including these tuners are coming into widespread use. In addition, digital audio-visual data recording/reproducing devices (hard disk recorders) for recording audio visual (AV) data of broadcasted programs and the like are also being used.

The above-described digital audio-visual data recording/reproducing device is connected to a device such as a tuner by means of, for example, a bus based on the IEEE 1394 standard, and isochronous transfer (synchronous transfer) is used such that the transfer, recording, reproduction, display and the like of AV data (AV stream data) can be performed with an appropriate timing in which temporal continuity is ensured.

In the case of transferring AV data by synchronous transfer as described above, however, the transfer always requires the same actual time as in the case where an actual displaying is performed, although temporal continuity is ensured. Therefore, it takes one hour to duplicate or transport, for example, one hour of AV data between recording/reproducing devices, regardless of the transfer capability and the like of the bus.

SUMMARY OF THE INVENTION

Therefore, with the foregoing in mind, it is an object of the present invention to realize high-speed transfer when duplicating or transporting AV data between devices such as recording/reproducing devices.

The above-described object is achieved in accordance with a first aspect of the present invention by providing an audio-visual data recording/reproducing device for recording/reproducing stream data that are transferred synchronously with a display timing, comprising:

a stream data input/output interface for inputting/outputting the stream data from/to an external device;

a timestamp adding and recording portion for generating timestamped data to which a timestamp corresponding to the display timing has been added based on the stream data that are input via the stream data input/output interface and for recording the timestamped data in a recording medium;

a stream data reproducing portion for reproducing stream data based on timestamped data that are read from the recording medium, in order to output the stream data via the stream data input/output interface;

an asynchronous input/output interface for inputting/outputting from/to the external device, timestamped data having a timestamp added thereto that are transferred asynchronously with the display timing;

an asynchronous transfer data recording portion for recording the timestamped data that are input via the asynchronous input/output interface in the recording medium; and an asynchronous transfer data reproducing portion for reading timestamped data from the recording medium, in order to output the timestamped data via the asynchronous input/output interface.

The present invention provides, in a second aspect thereof, an audio-visual data recording/reproducing device according to the first aspect, further comprising the recording medium in which the timestamped data are recorded.

With the device according to the first or second aspect, it is possible to store stream data that are transferred synchronously with a display timing, as timestamped data that can be displayed with an appropriate timing. It is also possible to reproduce the stream data based on such timestamped data that are stored and to display the data with an appropriate timing. Moreover, it is possible to transfer timestamped data as described above with a timing that is independent of the display timing by asynchronous transfer, thereby transferring the data at high speeds, regardless of the time required for actually displaying the data.

Here, the above-described timestamp may be any timestamp that can appropriately reproduce the stream data, such as information showing a time in which each of the packets constituting stream data is to be transferred or displayed, and there is no particular limitation on its form or storage method.

The present invention provides, in a third aspect thereof, an audio-visual data recording/reproducing device according to the first aspect, wherein synchronous transfer is performed with higher preference than asynchronous transfer.

The present invention also provides, in a fourth aspect thereof, an audio-visual data recording/reproducing device according to the third aspect, wherein, when there is a request for the synchronous transfer during the asynchronous transfer, the asynchronous transfer is interrupted and the synchronous transfer is performed, and the asynchronous transfer is resumed when the synchronous transfer is completed.

With the device according to the third or fourth aspect, it is possible to preferentially perform transfer of stream data with an appropriate timing with reliability, thereby ensuring the quality and the like of recording or an image to be displayed.

The present invention provides, in a fifth aspect thereof, an audio-visual data recording/reproducing device according to the fourth aspect, wherein, when the asynchronous transfer is interrupted, information showing a state during the interruption is held, and then the asynchronous transfer is resumed based on the held information.

With the device according to the fifth aspect, it is possible to appropriately perform transfer of stream data in the above-described manner, and to reliably perform asynchronous transfer of timestamped data.

The present invention provides, in a sixth aspect thereof, an audio-visual data recording/reproducing device according to the third aspect, wherein, when there is a request for the asynchronous transfer during the synchronous transfer, the request for the asynchronous transfer is rejected.

The present invention also provides, in a seventh aspect thereof, an audio-visual data recording/reproducing device according to the third aspect, wherein, when there is a request for the asynchronous transfer during the synchronous transfer, the asynchronous transfer is left pending until the synchronous transfer is completed.

With the device according to the sixth or seventh aspect, it is also possible to preferentially perform transfer of stream data with an appropriate timing with reliability.

The present invention provides, in an eighth aspect thereof, an audio-visual data recording/reproducing device according to the seventh aspect, wherein, when there is a request for the asynchronous transfer during the synchronous transfer, transfer of the timestamped data is left pending in a state in which the timestamped data has been read from the recording medium by the asynchronous transfer data reproducing portion.

With the device according to the eighth aspect, transfer of stream data is preferentially performed, while on the other hand, preparation for asynchronous transfer of timestamped data is performed when transfer of that stream data is performed. Consequently, it is possible to promptly start asynchronous transfer of the timestamped data when transfer of the stream data is completed.

The present invention also provides, in a ninth aspect thereof, an audio-visual data recording/reproducing device according to the first aspect, wherein the synchronous transfer and the asynchronous transfer can be performed in parallel.

With the device according to the ninth aspect, when there is enough room in the transfer band or the processing capability of the recording/reproducing device, it is possible to record or display audio-visual data by transfer of stream data and to perform high-speed transfer of timestamped data.

The present invention also provides, in a tenth aspect thereof, an audio-visual data recording/reproducing device according to the first aspect, wherein at least one of the transfer bands of the synchronous transfer and the asynchronous transfer can be set in a variable manner.

With the device according to the tenth aspect, for example, it is possible to broaden the transfer band of stream data to perform transfer in which the quality of recording or an image to be displayed is ensured, or to narrow the above-described transfer band to perform transfer of timestamped data at higher speeds, thereby readily improving the transfer efficiency.

The present invention provides, in an eleventh aspect thereof, an audio-visual data recording/reproducing device according to the tenth aspect, further comprising a buffer memory for holding the timestamped data associated with the synchronous transfer and the timestamped data associated with the asynchronous transfer, wherein a ratio between a size of a region where the timestamped data associated with the synchronous transfer and a size of a region where the timestamped data associated with the asynchronous transfer in the buffer memory is set in accordance with the setting of the transfer bands.

With the device according to the eleventh aspect, the area of a buffer memory corresponding to a transfer band is reserved, so that it is possible to improve the transfer efficiency more reliably.

The present invention provides, in a twelfth aspect thereof, an audio-visual data recording/reproducing device according to the first aspect, further comprising:

an encryption portion for encrypting the timestamped data that are input via the asynchronous input/output interface and that are recorded in the recording medium by the asynchronous transfer data recording portion; and a decryption portion for decrypting the timestamped data that are read from the recording medium by the asynchronous transfer data reproducing portion and that are transferred to the external device via the asynchronous input/output interface.

The present invention provides, in a thirteenth aspect thereof, an audio-visual data recording/reproducing device according to the twelfth aspect, wherein the encryption portion and the decryption portion perform encryption or decryption, using key information that is unique to the audio-visual data recording/reproducing device.

The present invention provides, in a fourteenth aspect thereof, an audio-visual data recording/reproducing device according to the twelfth aspect, further comprising:

copyright information-detecting means for detecting information relating to copyright of the timestamped data that are transferred via the asynchronous input/output interface; and copyright protection-control means for causing the encryption portion to encrypt the timestamped data when copyright protection is required, and causing the decryption portion to decrypt the encrypted timestamped data when copyright protection is required and the external device has a copyright protection function.

With the devices according to the twelfth to fourteenth aspects, even in the case where asynchronous transfer is performed, stream data are stored in a recording medium after being encrypted, and the data are decrypted before being transferred only when the copyright is protected. Therefore, it is possible to reliably prevent unauthorized retrieval or unauthorized duplication by any other devices of stream data stored in the recording medium.

The present invention also provides, in a fifteenth aspect thereof, an audio-visual data recording device for recording stream data that are transferred synchronously with a display timing, comprising:

a stream data input interface for inputting the stream data from an external device; and a timestamp adding and recording portion for generating timestamped data to which a timestamp corresponding to the display timing has been added thereto based on the stream data that are input via the stream data input interface and for recording the time stamped data in a recording medium;

an asynchronous input interface for inputting timestamped data already having a timestamp added thereto that are transferred asynchronously with the display timing from the external device; and an asynchronous transfer data recording portion for recording the timestamped data that are input via the asynchronous input interface in the recording medium.

The present invention provides, in a sixteenth aspect thereof, an audio-visual data reproducing device for reproducing timestamped data to which a timestamp corresponding to a display timing has been added thereto that are recorded on a recording medium and for transferring the timestamped data as stream data that are synchronous with the display timing to an external device, comprising:

a stream data reproducing portion for reading the timestamped data recorded in the recording medium, for eliminating the timestamp from the timestamped data and for outputting the stream data with a timing based on the timestamped data; and a stream data output interface for outputting, to the external device, the stream data that are output from the stream data reproducing portion;

an asynchronous output interface for outputting, to the external device, the timestamped data having the timestamp added thereto that are transferred asynchronously with the display timing; and an asynchronous transfer data reproducing portion for reading the timestamped data from the recording medium, in order to output the timestamped data via the asynchronous output interface.

With the device according to the fifteenth or sixteenth aspect, by the same mechanism as that described with regard to the device according to the first aspect, it is possible to obtain an audio-visual data recording device for recording only or an audio-visual data reproducing device for reproduction only with which stream data can be transferred at high speeds.

DETAILED DESCRIPTION OF THE INVENTION

Hereinbelow, preferred embodiments of the present invention are described with reference to the appended drawings.

Configuration of Audio-visual Data Recording/Reproducing Device

Figure 1:
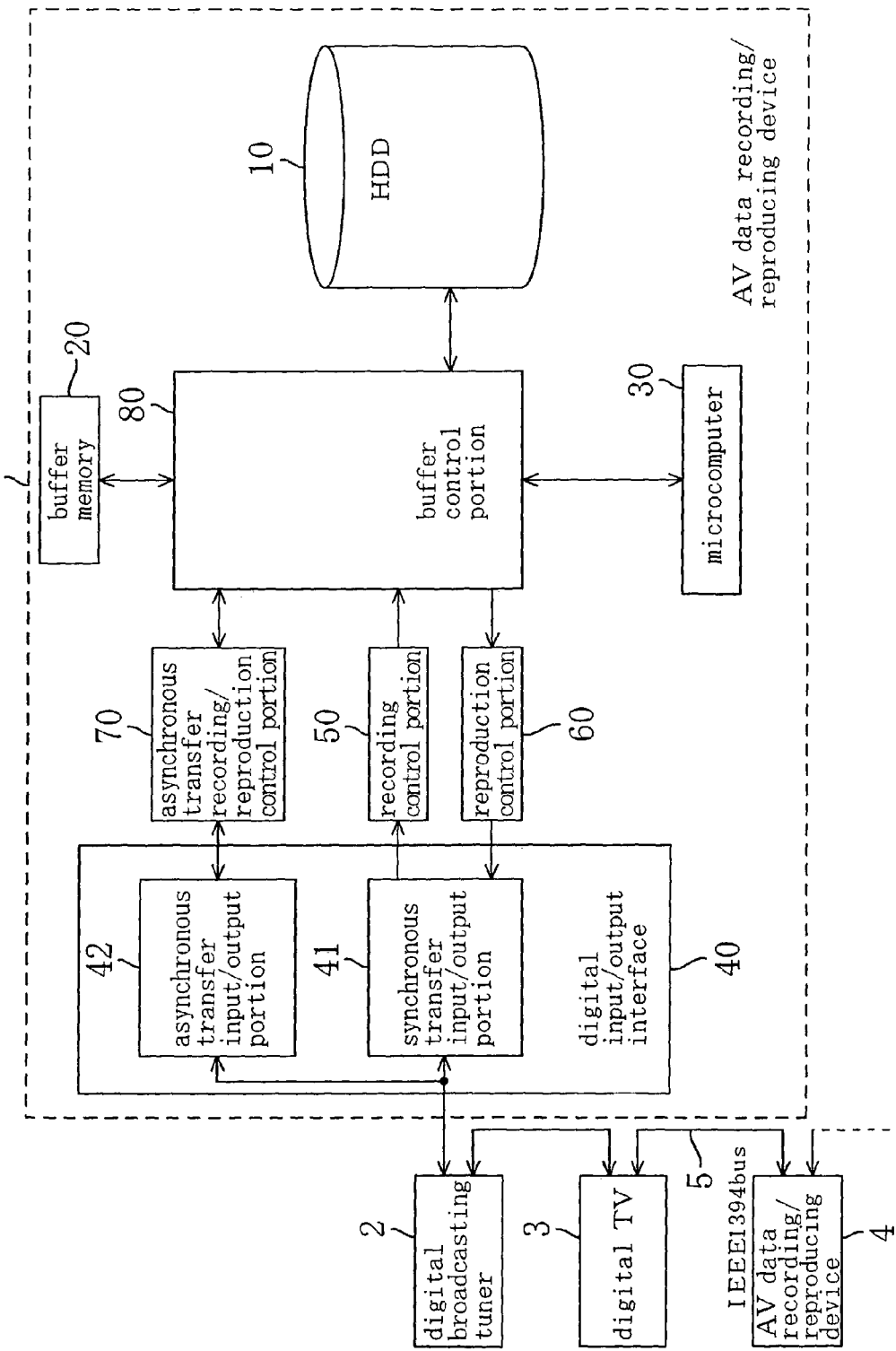
FIG. 1 is a block diagram showing an example of the configuration of an audio-visual data recording/reproducing device according to the present invention.

FIG. 1 is a block diagram showing of the configuration of an AV data recording/reproducing device (audio-visual data recording/reproducing device) according to an embodiment of the present invention. Referring to FIG. 1, an AV data recording/reproducing device 1 of the present invention is connected to external devices such as a digital broadcasting tuner 2, a digital TV 3 and another AV data recording/reproducing device 4 having a configuration similar to that of the AV data recording/reproducing device 1 via an IEEE1394 bus 5.

The AV data recording/reproducing device 1 includes an HDD 10 (hard disk drive: recording medium), a buffer memory 20, a microcomputer 30, a digital input/output interface 40 (stream data input/output interface and asynchronous input/output interface), a recording control portion 50 (timestamp adding and recording portion), a reproduction control portion 60 (stream data reproducing portion), an asynchronous transfer recording/reproduction control portion 70 (asynchronous transfer data recording portion and asynchronous transfer data reproducing portion) and a buffer control portion 80.

The digital input/output interface 40 includes a synchronous transfer input/output portion 41 and an asynchronous transfer input/output portion 42, and it performs synchronous transfer and asynchronous transfer of AV data by serial transfer via the IEEE1394 bus 5, and inputs and outputs various control commands. More specifically, the synchronous transfer input/output portion 41 mainly inputs and outputs AV data as stream data, for example in a form of an MPEG-2 packet transport stream by isochronous communication. The asynchronous transfer input/output portion 42 asynchronously inputs and outputs AV data for example by SBP-2 (Serial Bus Protocol-2) transfer. By providing the digital input/output interface 40 that is adapted to several types of protocols in this manner, it is possible to connect any device adapted to these protocols and transfer data to/from it.

The recording control portion 50 generates timestamped data including, for example, transport stream packets as AV information and a timestamp as management information, from the stream data input by the digital input/output interface 40 at the time of recording AV data.

The timestamped data generated by the recording control portion 50 are transferred to the HDD 10 via the buffer memory 20.

The HDD 10 stores the transferred timestamped data. Here, for example, an HDD having an ATA (AT Attachment) interface or a DVD (Digital Versatile Disc) drive having an ATAPI (ATA Packet Interface) interface can be used as the HDD 10. That is, the timestamped data are recorded and reproduced as above, so that writing and reading to/from the HDD 10 or the transfer between the HDD 10 and the buffer memory 20 does not have to be performed synchronously with the transfer of the stream data. Therefore, a variety of recording media can be readily used. In addition, the HDD 10 may be disposed outside the AV data recording/reproducing device 1.

At the time of reproducing AV data, the timestamped data that are stored and read in and from the HDD 10 are transferred to the reproduction control portion 60 via the buffer memory 20.

The reproduction control portion 60 reproduces the stream data based on the timestamped data read from the HDD 10, and causes the digital input/output interface 40 to output the reproduced stream data.

Furthermore, in the AV data recording/reproducing device 1 according to this embodiment, timestamped data already having a timestamp added thereto are asynchronously transferred and recorded/reproduced by the asynchronous transfer input/output portion 42 of the digital input/output interface 40 and the asynchronous transfer recording/reproduction control portion 70. More specifically, the timestamped data input from the IEEE1394 bus 5 to the asynchronous transfer input/output portion 42 are stored in the HDD 10 via the asynchronous transfer recording/reproduction control portion 70 and the buffer memory 20, whereas the timestamped data read from the HDD 10 are output as they are (without eliminating the timestamp therefrom) from the asynchronous transfer input/output portion 42 to the IEEE1394 bus 5, via the buffer memory 20 and the asynchronous transfer recording/reproduction control portion 70. Here, the asynchronous transfer recording/reproduction control portion 70 controls the start or stop of transfer and the direction of transfer in the AV data recording/reproducing device 1 for recording and reproducing data. That is, it transfers the data output from the asynchronous transfer input/output portion 42 to the buffer memory 20 or transfers the data read from the buffer memory 20 to the asynchronous transfer input/output portion 42, and controls the start and stop of these transfers. In the case of providing separate asynchronous transfer input/output portions 42 for the input and the output from/to the IEEE1394 bus 5 (providing a FIFO (First in First Out) buffer for input and a FIFO buffer for output, separately), the asynchronous transfer recording/reproduction control portion 70 does not necessary have to be provided, and, for example, the recording/reproduction may be controlled by controlling the buffer control portion 80 with the microcomputer 30. In this case, the recording and the reproduction of data by asynchronous transfer can be performed simultaneously.

The buffer control portion 80 controls the transfer of the timestamped data (e.g., switching of the transfer destinations) between the recording control portion 50 and the buffer memory 20, between the buffer memory 20 and the HDD 10, between the buffer memory 20 and the reproduction control portion 60, and between the asynchronous transfer recording/reproduction control portion 70 and the buffer memory 20.

The microcomputer 30 controls the operation of each portion of the AV data recording/reproducing device 1, including the control of the buffer control portion 80.

Operation of Audio-visual Data Recording/Reproducing Device: Synchronous Transfer An example of recording and reproduction with an audio-visual data recording/reproducing device having the above-described configuration is described. When AV data received by the digital broadcasting tuner 2 are displayed by the digital TV 3 after they are temporarily stored in the HDD 10, the following operation is performed. First, the AV data are transferred from the digital broadcasting tuner 2 to the AV data recording/reproducing device 1 by isochronous transfer as stream data with a timing that is synchronous with the display timing, that is, a timing corresponding to the elapsed time when the AV data is actually displayed. Then, by adding a timestamp to the data in the recording control portion 50, the data are recorded in the HDD 10 with a timing that is asynchronous with the above-described timing. After the data is read from the HDD 10 with a given timing (within a range where any overflow or underflow of the buffer memory 20 does not occur), the reproduction control portion 60 outputs the data as stream data from the synchronous transfer input/output portion 41 with a timing corresponding to the above-described timestamp. Consequently, the AV data are transferred to the digital TV 3 with the same timing as in the case where, for example, they are transferred from the digital broadcasting tuner 2, and the display is performed with an appropriate timing.

Operation of Audio-visual Data Recording/Reproducing Device: Asynchronous Transfer While the transfer of AV data between, for example, the AV data recording/reproducing devices 1 and 4 can be similarly performed by isochronous transfer as described above, it can also be performed at high speeds by SBP-2 transfer.

More specifically, for example, when the AV data recording/reproducing device 4 makes a request to the AV data recording/reproducing device 1 that AV data be transferred from the AV data recording/reproducing device 4 to the AV data recording/reproducing device 1 (in this case, actually, reading from the AV data recording/reproducing device 4 is performed by the AV data recording/reproducing device 1), first, the AV data recording/reproducing device 4 serves as an initiator and issues a login request to the AV data recording/reproducing device 1 serving as a target. Then, by supplying to the AV data recording/reproducing device 1, the first address and the total data length of the transfer data storage area in the buffer of the AV data recording/reproducing device 4, the AV data recording/reproducing device 1 successively reads the AV data held in the buffer of the AV data recording/reproducing device 4 via the IEEE1394 bus 5 and stores the read AV data in the HDD 10 under the control of the microcomputer 30. When the transfer of the AV data is completed, the AV data recording/reproducing device 4 issues a logout request, and the AV data recording/reproducing device 1 releases the resources used for the transfer, thus completing the transfer.

On the other hand, when the AV data recording/reproducing device 4 makes a request that AV data be transferred from the AV data recording/reproducing device 1 to the AV data recording/reproducing device 4 (in this case, writing to the AV data recording/reproducing device 4 is performed by the AV data recording/reproducing device 1), it similarly issues a login request and assigns information that specifies the requested AV data (e.g., a logical block address of a sector in the HDD 10). Consequently, the AV data recording/reproducing device 1 causes the buffer memory 20 to temporarily hold the AV data stored in the HDD 10 by the control by the microcomputer 30 and then successively transfers the AV data to the AV data recording/reproducing device 4 via the IEEE1394 bus 5, and the AV data recording/reproducing device 4 stores the transferred AV data in its HDD.

If the AV data transferred in the above-describe manner are AV data having a timestamp added thereto that are stored in the HDD 10 (or the HDD of the AV data recording/reproducing device 4) as described above, the AV data will be stored in the HDD to which they are transferred, in the same form as when they are transferred by isochronous transfer. Therefore, the AV data can be displayed by the digital TV 3 with an appropriate timing by reproducing stream data based on the timestamp with the reproduction control portion 60 in the same manner as described above with regard to synchronous transfer. Moreover, the above-described SBP-2 transfer can be performed with a timing that is independent of the display timing of the AV data, so that the AV data can be transferred at high speeds within the band of the IEEE1394 bus 5 or the processing capability range of the devices, regardless of the time required for actually displaying the data.

It should be noted that when AV data that require copyright protection are transferred, isochronous transfer may be always performed without using the above-described SBP-2 transfer, and the SBP-2 transfer can be performed only for AV data that are not protected by copyright or AV data taken by home video cameras.

Operation in the Case of Conflicting Isochronous Transfer and SBP-2 Transfer

Giving Preference to Isochronous Transfer

Figure 2:
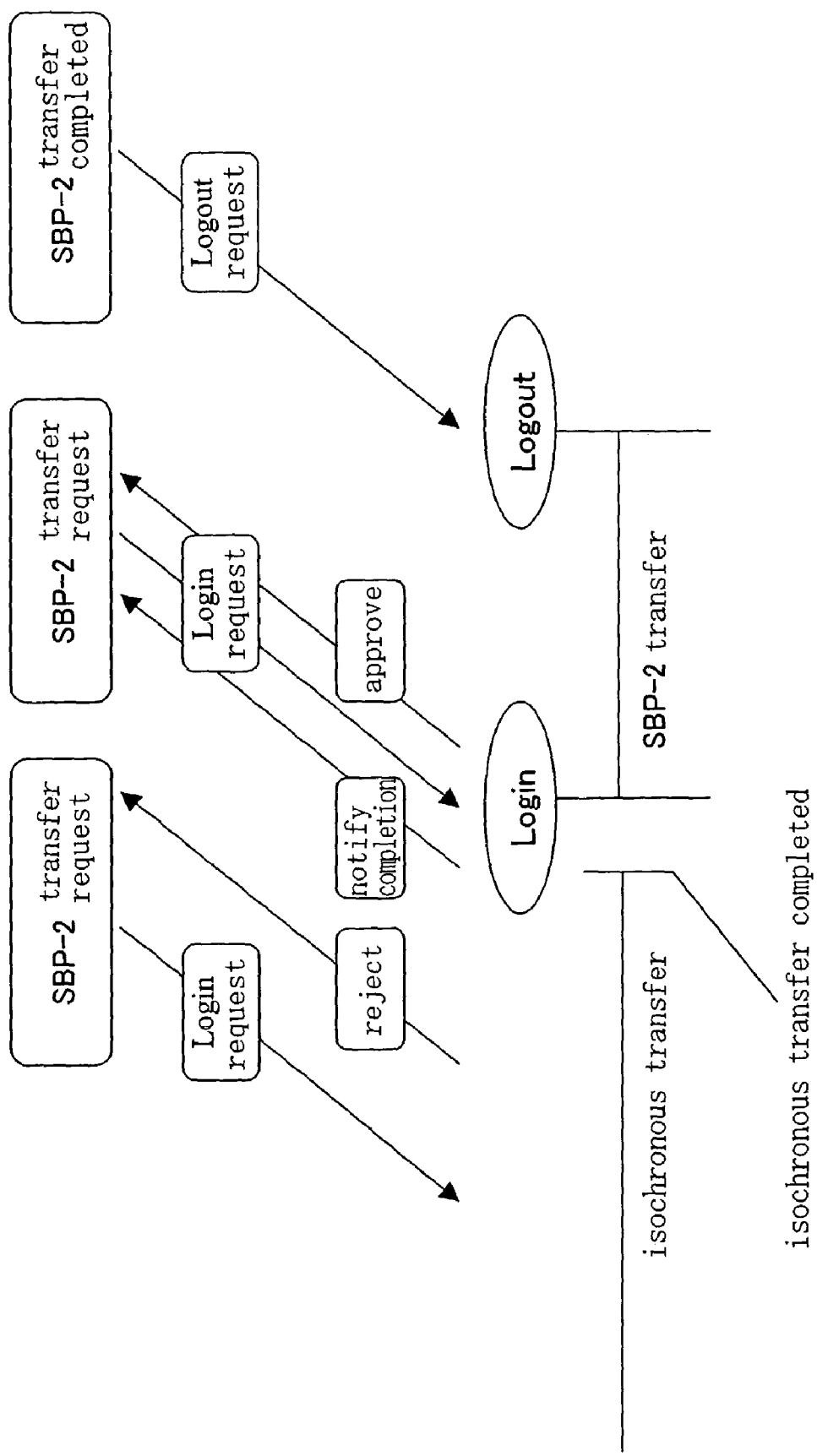
FIG. 2 is a diagram illustrating a transfer state in the case of rejecting an SBP-2 transfer request.

If a login request is issued by, for example, the AV data recording/reproducing device 4 while isochronous transfer is performed, the isochronous transfer is continued preferentially. More specifically, as schematically shown in FIG. 2, when a login request is issued during isochronous transfer, the asynchronous transfer input/output portion 42 of the AV data recording/reproducing device 1 notifies the AV data recording/reproducing device 4 that it rejects the request. Then, when the isochronous transfer is completed, it notifies the AV data recording/reproducing device 4 of such completion (or that SPB-2 transfer can be performed). When a login request is issued again from the AV data recording/reproducing device 4 in response to this, SBP-2 transfer is performed in the above-described manner. Here, even when a login request is rejected as described above, if the login request is one requesting the transfer of data from the AV data recording/reproducing device 1 to the AV data recording/reproducing device 4, the data to be transferred may be previously read from the HDD 10 and held in the buffer memory 20. That is, for example, when isochronous transfer is preferentially performed because there is not enough room left in the transfer band of the IEEE1394 bus 5, SBP-2 transfer can be promptly started after the completion of isochronous transfer by preparing for SBP-2 transfer in advance during isochronous transfer, if there is enough room left in the processing capability of the microcomputer 30 or the like.

Figure 3:
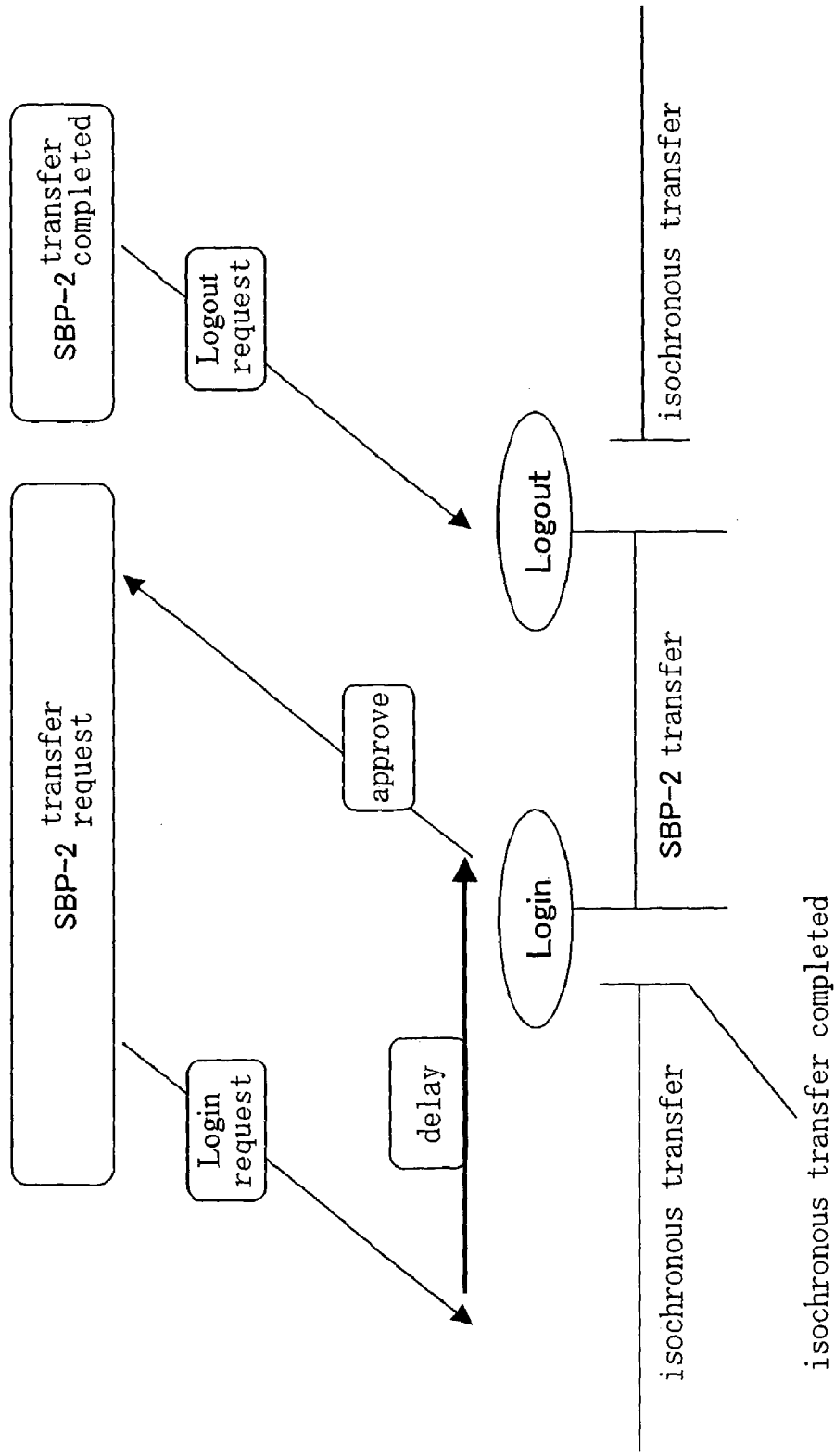
FIG. 3 is a diagram illustrating a transfer state in the case of delaying an SBP-2 transfer request.

Additionally, instead of rejecting a login request as above, it is also possible to delay the response for a login request. More specifically, as shown in FIG. 3, SBP-2 transfer can be performed after the completion of isochronous transfer without the need to provide, for example, the function to provide notification of the completion of isochronous transfer as described above and the function to receive the notification, by providing the notification of approval of transfer after the completion of isochronous transfer instead of immediately providing the notification of rejection or approval of transfer in response to a login request . In this case, also, SBP-2 transfer can be promptly started after the completion of isochronous transfer by preparing for SBP-2 transfer during isochronous transfer.

Figure 4:
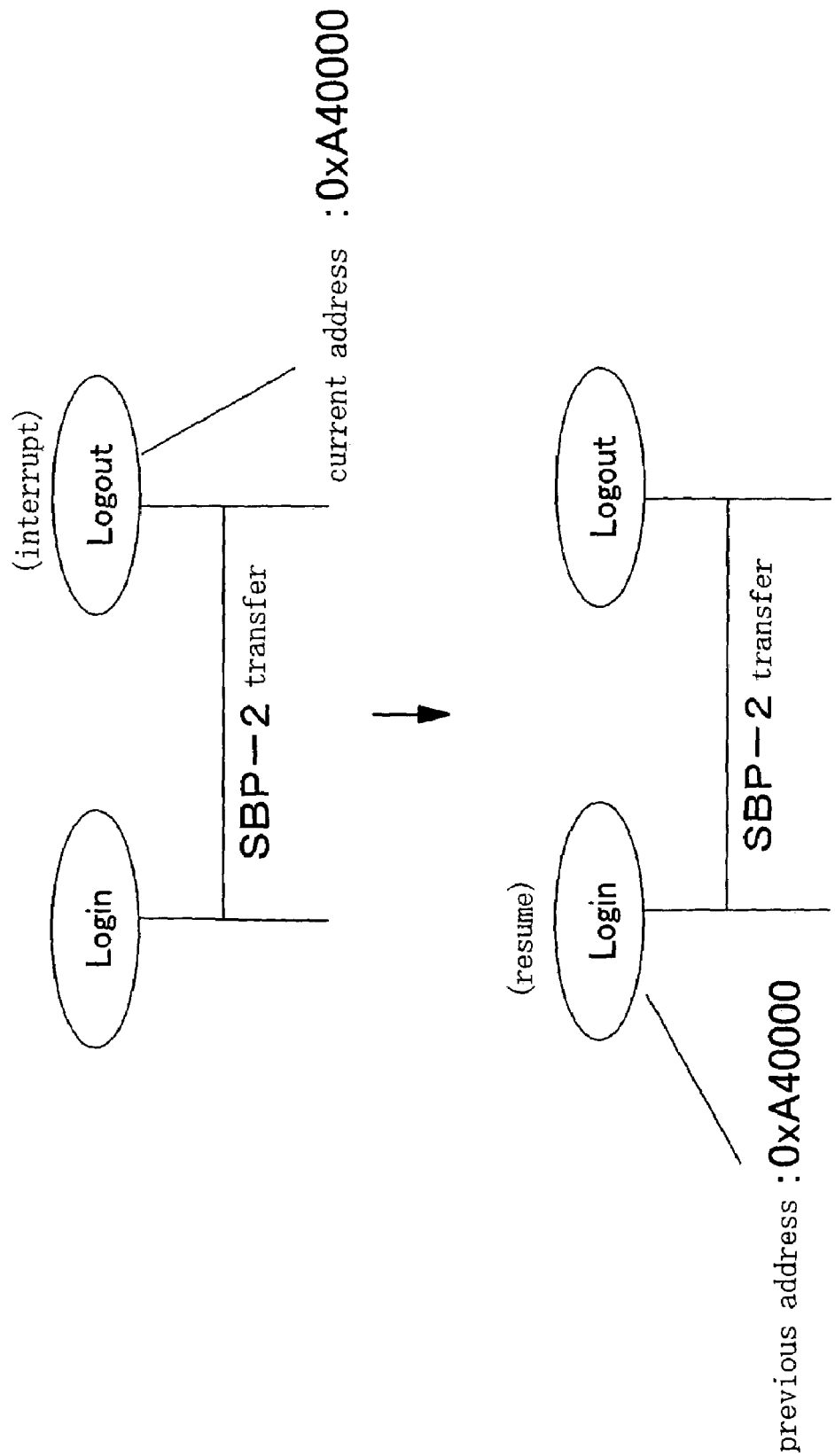
FIG. 4 is a diagram illustrating an example in which an address of transfer data is held in the case of interrupting an SBP-2 transfer request.

On the other hand, when a request for isochronous transfer is made while SBP-2 transfer is performed, SBP-2 transfer is temporarily interrupted and resumed after the completion of isochronous transfer. More specifically, for example, if the necessity arises to interrupt SBP-2 transfer in the AV data recording/reproducing device 1 when the AV data recording/reproducing device 1 serves as an initiator and the AV data recording/reproducing device 4 serving as a target performs the writing/reading of AV data to the AV data recording/reproducing device 1, then the AV data recording/reproducing device 1 issues a logout request first. The AV data recording/reproducing device 4 processes the request in the same manner as with an ordinary logout request, and further notifies the AV data recording/reproducing device 1 of the address (e.g., FIG. 4) of an area to be subsequently written/read of the buffer memory 20 or of the HDD 10. The AV data recording/reproducing device 1 holds the notified address, information showing the interruption of SBP-2 transfer and information showing a state during the interruption of transfer, such as the node of the transfer destination and the type of transfer (whether transfer is reading or writing). When the resumption of SBP-2 transfer becomes possible, SBP-2 transfer can be continued by issuing a login request based on the above-described information in the same manner as in a normal start of transfer. In addition, if there is any cause for the interruption of transfer in the AV data recording/reproducing device 4 serving as the target, this is notified to the AV data recording/reproducing device 1 from the AV data recording/reproducing device 4, and the AV data recording/reproducing device 1 issues a logout request in response to this, while holding the information showing a state during the interruption of transfer. Consequently, SBP-2 transfer can be interrupted and resumed in the same manner as described above.

Instead of notifying the initiator of the write/read address at the time of the interruption of transfer as above, the write/read address may be held in the target together with information showing a state during the interruption of transfer such as the node of the transfer destination. Then, when transfer is resumed, the initiator may issue a login request without showing the address or the like (or specifying a dummy address), and the target may continue the writing/reading of data based on the above-described address held therein. Here, when SBP-2 transfer is performed only between specific devices, the information showing the state during the interruption of transfer does not necessary have to include information showing the node of the transfer destination. On the other hand, if a plurality of SBP-2 transfers are performed, it may include, for example, IDs for specifying the respective transfers. In addition, the process performed at the time of resuming transfer can be simplified by interrupting the transfer in units such as a sector size of the HDD 10, instead of immediately interrupting transfer in response to a logout request.

Simultaneous Isochronous Transfer and SBP Transfer

Figure 5:
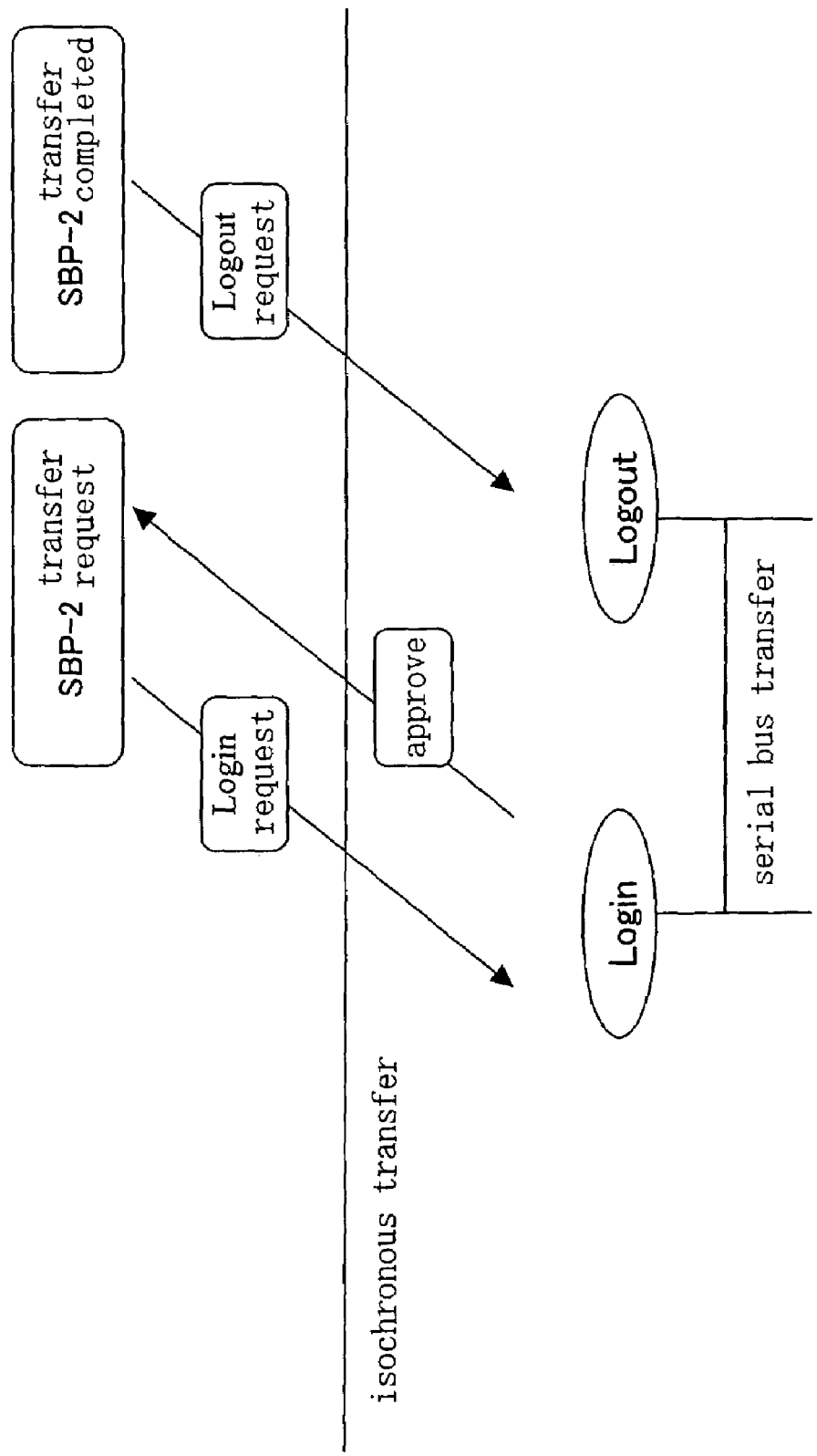
FIG. 5 is a diagram illustrating a transfer state in the case of performing isochronous transfer and SBP-2 transfer in parallel.
Figure 6:
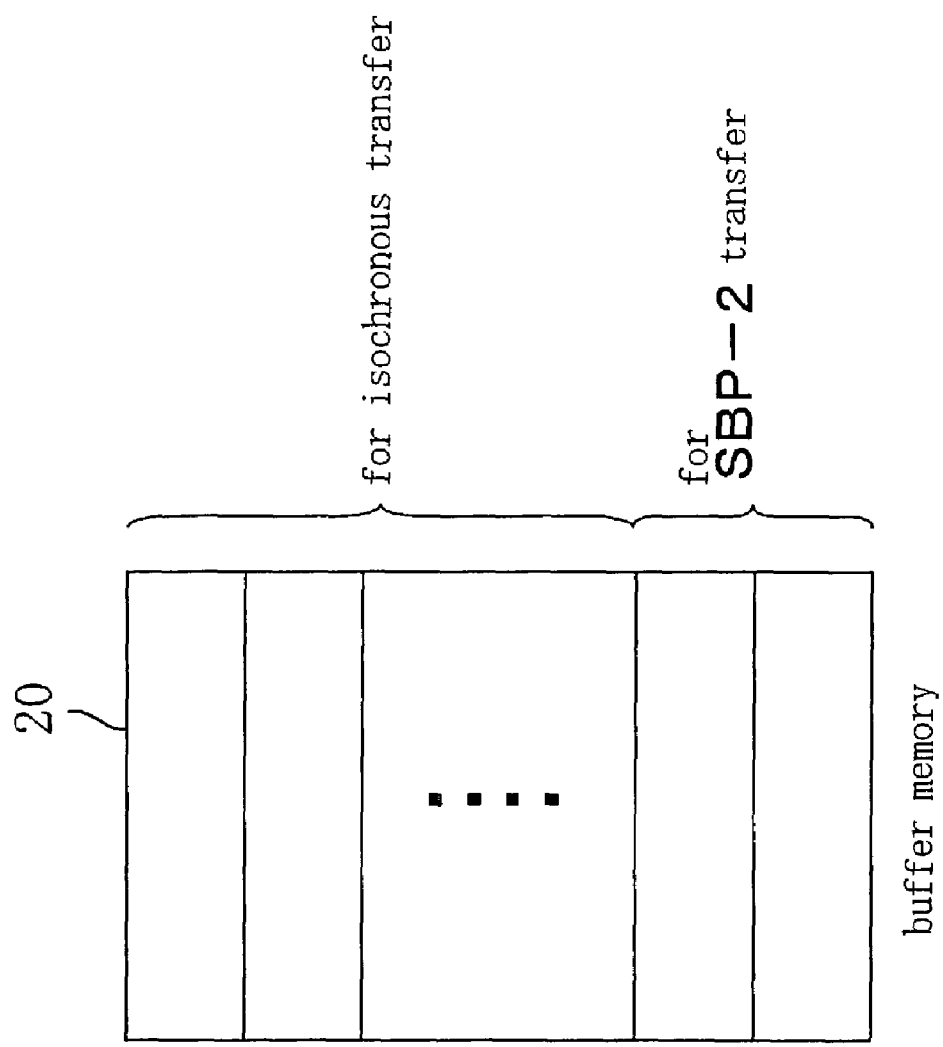
FIG. 6 is a diagram illustrating an example in which the area of a buffer memory is divided for isochronous transfer and SBP-2 transfer.

When there is enough room in the transfer band of the IEEE1394 bus 5 or the processing capability of the AV data recording/reproducing device 1 (e.g., the processing capability of the microcomputer 30 and the access rate of the HDD 10), isochronous transfer and SBP-2 transfer may be performed simultaneously (in parallel). For example, as shown in FIG. 5, when a login request is issued while isochronous transfer is performed, isochronous transfer and SBP-2 transfer can be performed simultaneously by accepting this request and causing the microcomputer 30 to accept an interrupt associated with SBP-2 transfer from the asynchronous transfer input/output portion 42 and the like. In this case, as shown in FIG. 6, an area in the buffer memory 20 is reserved for each of the transfers. (It is also possible to divide the areas to be reserved even when there are no simultaneous transfers).

Figure 7:
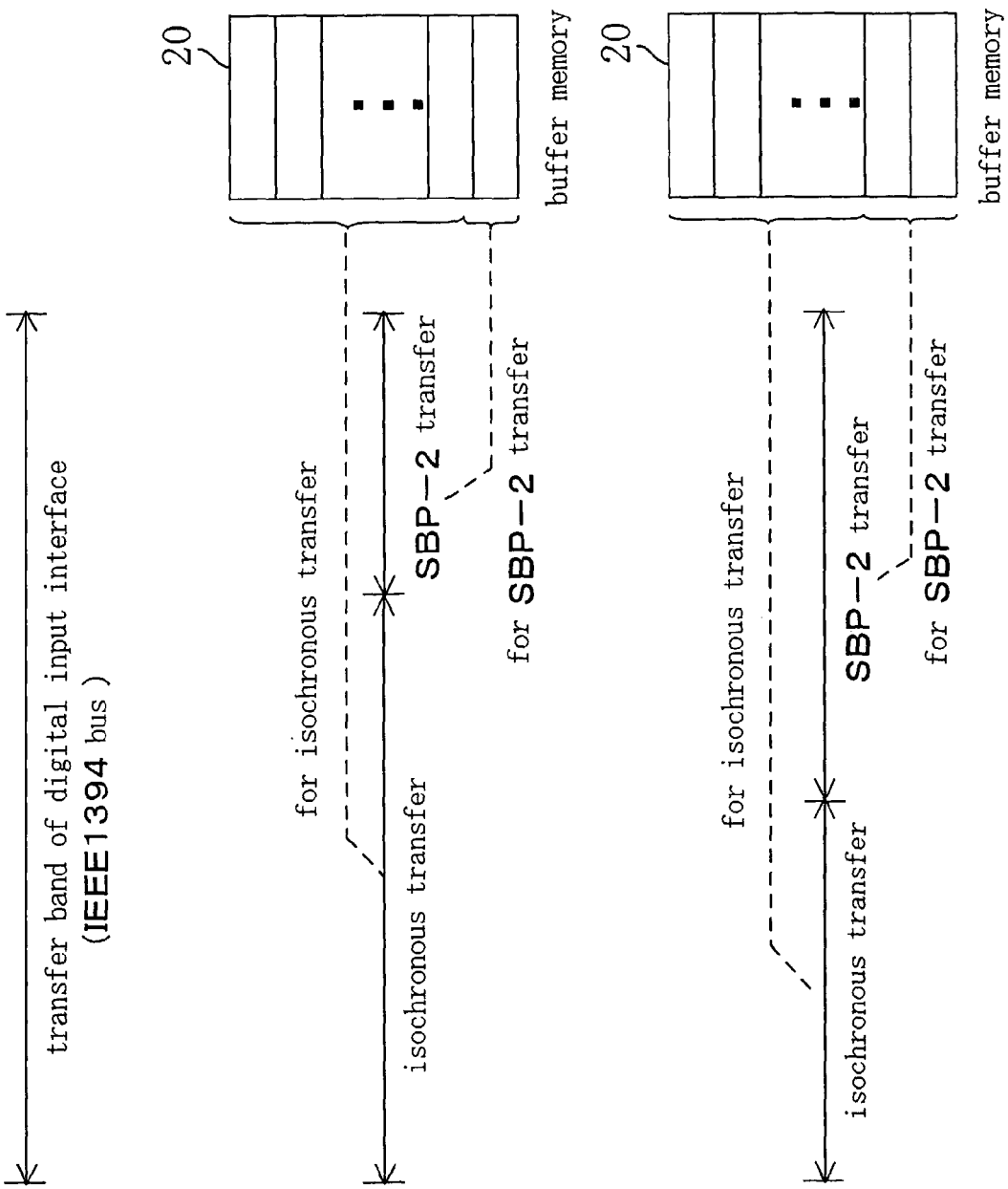
FIG. 7 is a diagram illustrating the relationship between the allocation of a buffer memory and the setting of the transfer bands of isochronous transfer and SBP-2 transfer.

As schematically shown in FIG. 7, when there are simultaneous transfers, the ratio between the transfer band of isochronous transfer and the transfer band of SBP-2 transfer may be set to vary in accordance with the quality of the image transferred by isochronous transfer, for example. (It is also possible to perform this setting of the transfer bands in a variable manner even when there are no simultaneous transfers). At this time, as also shown in FIG. 7, the size of the area reserved for each of the transfers in the buffer memory 20 may be set in accordance with the setting of the transfer bands. These make it possible to simultaneously perform isochronous transfer and SBP-2 transfer and improve the transfer efficiency further.

Figure 8:
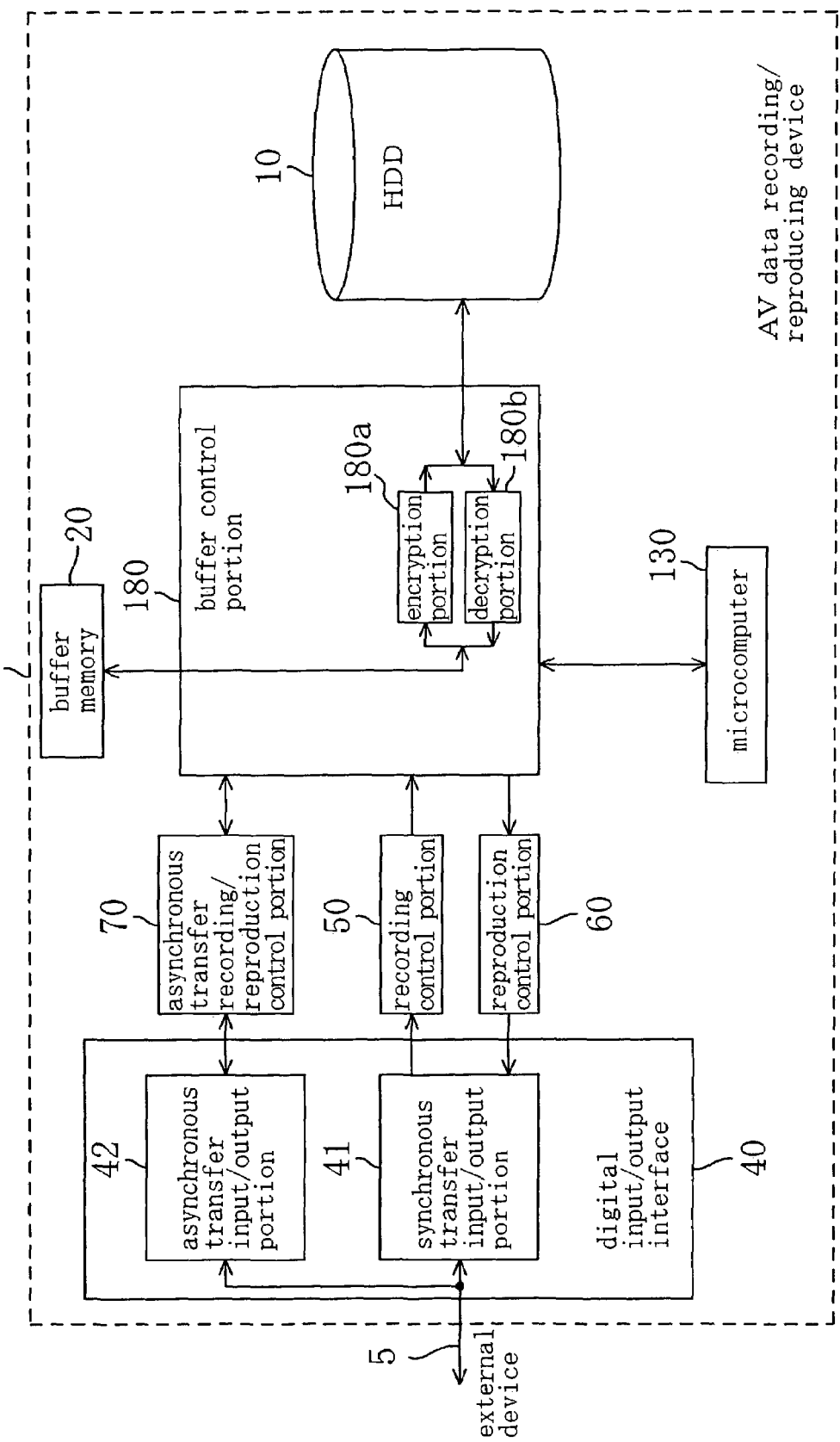
FIG. 8 is a block diagram showing an example of the configuration of an audio-visual data recording/reproducing device having a copyright protection function.

Audio-visual Data Recording/Reproducing Device Having Copyright Protection Function FIG. 8 is a block diagram showing the configuration of an AV data recording/reproducing device 101 having a copyright protection function. The AV data recording/reproducing device 101 is different from the AV data recording/reproducing device 1 shown in FIG. 1 in that it includes a buffer control portion 180 and a microcomputer 130 (copyright information-detecting means and copyright protection-control means), in place of the buffer control portion 80 and the microcomputer 30. As the other components, basically the same components as those shown in FIG. 1 can be used.

The buffer control portion 180 includes an encryption portion 180a and a decryption portion 180b. The encryption portion 180a encrypts timestamped data that are input from the asynchronous transfer recording/reproduction control portion 70 or the recording control portion 50 via the buffer memory 20, and records the data in the HDD 10. The decryption portion 180b decrypts the encrypted timestamped data read from the HDD 10, and outputs the data to the asynchronous transfer recording/reproduction control portion 70 or the reproduction control portion 60 via the buffer memory 20. The above-described encryption and decryption are performed, using key information that has been previously set in the AV data recording/reproducing device 101. Therefore, unauthorized reading of recorded AV data can be prevented, for example, when a DVD is used as a recording medium.

The microcomputer 130 detects information relating to the copyright protection of AV data (e.g., whether or not the data require protection by copyright, and the contents of the protection required) that are transferred via the asynchronous transfer recording/reproduction control portion 70, the recording control portion 50 or the reproduction control portion 60, and controls the encryption portion 180a and the decryption portion 180b according to the results of the detection. It also controls the approval or disapproval of transfer of AV data (timestamped data) recorded in the HDD 10 to another AV data recording/reproducing device serving as an external device.

More specifically, when AV data are transferred from an external device via the IEEE1394 bus 5, timestamped data that are asynchronously transferred or timestamped data that are synchronously transferred and to which a timestamp has been added by the recording control portion 50 are encrypted by the encryption portion 180a in accordance with the information relating to copyright protection of the AV data, and the data are recorded in the HDD 10.

When the encrypted AV data recorded in the HDD 10 are transferred to another AV data recording/reproducing device by synchronous transfer or asynchronous transfer, the transfer of the AV data by the asynchronous transfer recording/reproduction control portion 70 or the reproduction control portion 60 is approved in accordance with the information relating to the copyright protection, and the AV data read from the HDD 10 are decrypted by the decryption portion 180b. That is, in the case where copyright protection is not required or where copyright protection is guaranteed due to the relationship between the AV data recording/reproducing device 101 and the other AV data recording/reproducing device, the decrypted AV data are transferred to the other AV data recording/reproducing device. Specifically, the case where copyright protection is guaranteed refers to, for example, the case where an AV data recording/reproducing device to which AV data are transferred has the function to transport AV data (the function to delete AV data stored therein and transport the data to another recording/reproducing device) and the case where duplication is allowed a finite number of times and the AV data recording/reproducing device to which AV data are transferred has the function to inhibit any duplication therefrom.

By controlling encryption and decryption as described above and controlling the approval or disapproval of transfer, copyright is appropriately protected, regardless of whether the transfer method is synchronous transfer or asynchronous transfer.

It should be noted that although a common encryption portion 180a and decryption portion 180b are used for synchronous transfer and asynchronous transfer in the above example, the present invention is not limited thereto and separate encryption portions and decryption portions may be provided.

In addition, at the time of recording, AV data may be encrypted regardless of whether or not copyright protection is required, and the approval or disapproval of transfer or decryption may be controlled at the time of reproducing.

Although an audio-visual data recording/reproducing device capable of recording and reproducing stream data was described in the above embodiment, an audio-visual data recording device or audio-visual data reproducing device having the functions necessary for only recording or reproduction may be configured, for example, in the case of using a removable recording medium such as a DVD as a recording medium.

As described above, according to the present invention, the recording and the display with an appropriate timing of stream data can be performed by recording timestamped data in a recording medium based on stream data transferred in synchronization with a display timing, and reproducing and transferring the stream data based on a timestamp added to the data read from the recording medium. Furthermore, by making it possible to asynchronously transfer data to which a timestamp has been added, it is possible to duplicate or transport audio-visual data that can be displayed with an appropriate timing as described above, between devices such as recording/reproducing devices at high speeds, regardless of the time required at the time of an actual display.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An audio-visual data recording/reproducing device for recording/reproducing stream data that are transferred synchronously with a display timing, comprising:

a stream data input/output interface for inputting/outputting the stream data from/to an external device;

a timestamp adding and recording portion for generating timestamped data to which a timestamp corresponding to the display timing has been added based on the stream data that are input via the stream data input/output interface and for recording the timestamped data in a recording medium;

a stream data reproducing portion for reproducing stream data based on timestamped data that are read from the recording medium, in order to output the stream data via the stream data input/output interface;

an asynchronous input/output interface for inputting/outputting from/to the external device, timestamped data having a timestamp added thereto that are transferred asynchronously with the display timing;

an asynchronous transfer data recording portion for recording the timestamped data that are input via the asynchronous input/output interface in the recording medium; and an asynchronous transfer data reproducing portion for reading timestamped data from the recording medium, in order to output the timestamped data via the asynchronous input/output interface, wherein synchronous transfer through the stream data input/output interface is performed with higher preference than asynchronous transfer through the asynchronous input/out interface.

2. The audio-visual data recording/reproducing device according to claim 1, further comprising said recording medium in which the timestamped data are recorded.

3. The audio-visual data recording/reproducing device according to claim 1,
wherein, when there is a request for the synchronous transfer during the asynchronous transfer, the asynchronous transfer is interrupted and the synchronous transfer is performed, and the asynchronous transfer is resumed when the synchronous transfer is completed.

4. The audio-visual data recording/reproducing device according to claim 3,
wherein, when the asynchronous transfer is interrupted, information showing a state during the interruption is held, and then the asynchronous transfer is resumed based on the held information.

5. The audio-visual data recording/reproducing device according to claim 1,
wherein, when there is a request for the asynchronous transfer during the synchronous transfer, the request for the asynchronous transfer is rejected.

6. The audio-visual data recording/reproducing device according to claim 1,
wherein, when there is a request for the asynchronous transfer during the synchronous transfer, the asynchronous transfer is left pending until the synchronous transfer is completed.

7. The audio-visual data recording/reproducing device according to claim 6,
wherein, when there is a request for the asynchronous transfer during the synchronous transfer, transfer of the timestamped data is left pending in a stare in which the timestamped data has been read from the recording medium by the asynchronous transfer data reproducing portion.

8. The audio-visual data recording/reproducing device according to claim 1,
wherein the synchronous transfer and the asynchronous transfer can be performed in parallel.

9. The audio-visual data recording/reproducing device according to claim 1,
wherein at least one of the transfer bands of the synchronous transfer and the asynchronous transfer can be set in a variable manner.

10. The audio-visual data recording/reproducing device according to claim 9, further comprising a buffer memory for holding the timestamped data associated with the synchronous transfer and the timestamped data associated with the asynchronous transfer,
wherein a ratio between a size of a region where the timestamped data associated with the synchronous transfer and a size of a region where the timestamped data associated with the asynchronous transfer in the buffer memory is set in accordance with the setting of the transfer bands.

11. The audio-visual data recording/reproducing device according to claim 1, further comprising:
an encryption portion for encrypting the timestamped data that are input via the asynchronous input/output interface and that are recorded in the recording medium by the asynchronous transfer data recording portion; and
a decryption portion for decrypting the timestamped data that are read from the recording medium by the asynchronous transfer data reproducing portion and that are transferred to the external device via the asynchronous input/output interface.

12. The audio-visual data recording/reproducing device according to claim 11,
wherein the encryption portion and the decryption portion perform encryption or decryption, using key information that is unique to the audio-visual data recording/reproducing device.

13. The audio-visual data recording/reproducing device according to claim 11, further comprising:
copyright information-detecting means for detecting information relating to copyright of the timestamped data that are transferred via the asynchronous input/output interface; and
copyright protection-control means for causing the encryption portion to encrypt the timestamped data when copyright protection is required, and causing the decryption portion to decrypt the encrypted timestamped data when copyright protection is required and the external device has a copyright protection function.

14. An audio-visual data recording device for recording stream data that are transferred synchronously with a display timing, comprising:
a stream data input interface for inputting the stream data from an external device; and
a timestamp adding and recording portion for generating timestamped data to which a timestamp corresponding to the display timing has been added thereto based on the stream data that are input via the stream data input interface and for recording the time stamped data in a recording medium;
an asynchronous input interface for inputting timestamped data already having a timestamp added thereto that are transferred asynchronously wit the display timing from the external device;
and an asynchronous transfer data recording portion for recording the timestamped data that are input via the asynchronous input interface in the recording medium,
wherein synchronous transfer through the stream data input interface is performed with higher preference than asynchronous transfer through the asynchronous input interface.

15. An audio-visual data reproducing device for reproducing timestamped data to which a timestamp corresponding to a display timing has been added thereto that are recorded on a recording medium and for transferring the timestamped data as stream data that are synchronous with the display timing to an external device, comprising:
a stream data reproducing portion for reading the timestamped data recorded in the recording medium, for eliminating the timestamp from the timestamped data and for outputting the stream data with a timing based on the timestamped data; and
a stream data output interface for outputting, to the external device, the stream data that are output from the stream data reproducing portion;
an asynchronous output interface for outputting, to the external device, the timestamped data having the timestamp added thereto that are transferred asynchronously with the display timing; and
an asynchronous transfer data reproducing portion for reading the timestamped data from the recording medium, in order to output the timestamped data via the asynchronous output interface,
wherein synchronous transfer through the stream data output interface is performed with higher preference than asynchronous transfer through the asynchronous output interface.

* * * * *